United States Patent

[11] 3,599,181

[72] Inventor Geoffrey Dearnaley
Abingdon, England

[21] Appl. No. 781,721
[22] Filed Dec. 6, 1968
[45] Patented Aug. 10, 1971

[73] Assignee United Kingdom Atomic Energy Authority
London, England

[32] Priority Dec. 7, 1967
[33] Great Britain
[31] 55787/67

[54] SOLID STATE COMPUTER MEMORY DEVICE
8 Claims, 1 Drawing Fig.

[52] U.S. Cl. .......... 340/173CR, 313/89, 315/815
[51] Int. Cl. .......... G11c 11/34
[50] Field of Search .......... 313/89; 315/8.5; 340/173 CR, 173 LT

[56] References Cited

UNITED STATES PATENTS

| | | | |
|---|---|---|---|
| 2,786,880 | 3/1957 | McKay | 340/173 X |
| 3,015,738 | 1/1962 | Kammerer et al. | 315/8.5 X |
| 3,401,294 | 9/1968 | Cricchi et al. | 313/89 X |
| 3,408,531 | 10/1968 | Goetze et al. | 340/173 X |

*Primary Examiner*—Terrell W. Fears
*Attorney*—Larson, Taylor & Hinds

ABSTRACT: A film of oxide or fluoride on a conducting or semiconducting substrate is scanned by a finely focused electron beam. According to the intensity of the electron beam, filamentary conducting paths through the film may be set up, detected without destruction, or erased. Depending upon the size of the electron beam spot up to $10^7$ bits of binary information per square centimeter may be stored in the device.

PATENTED AUG 10 1971 3,599,181
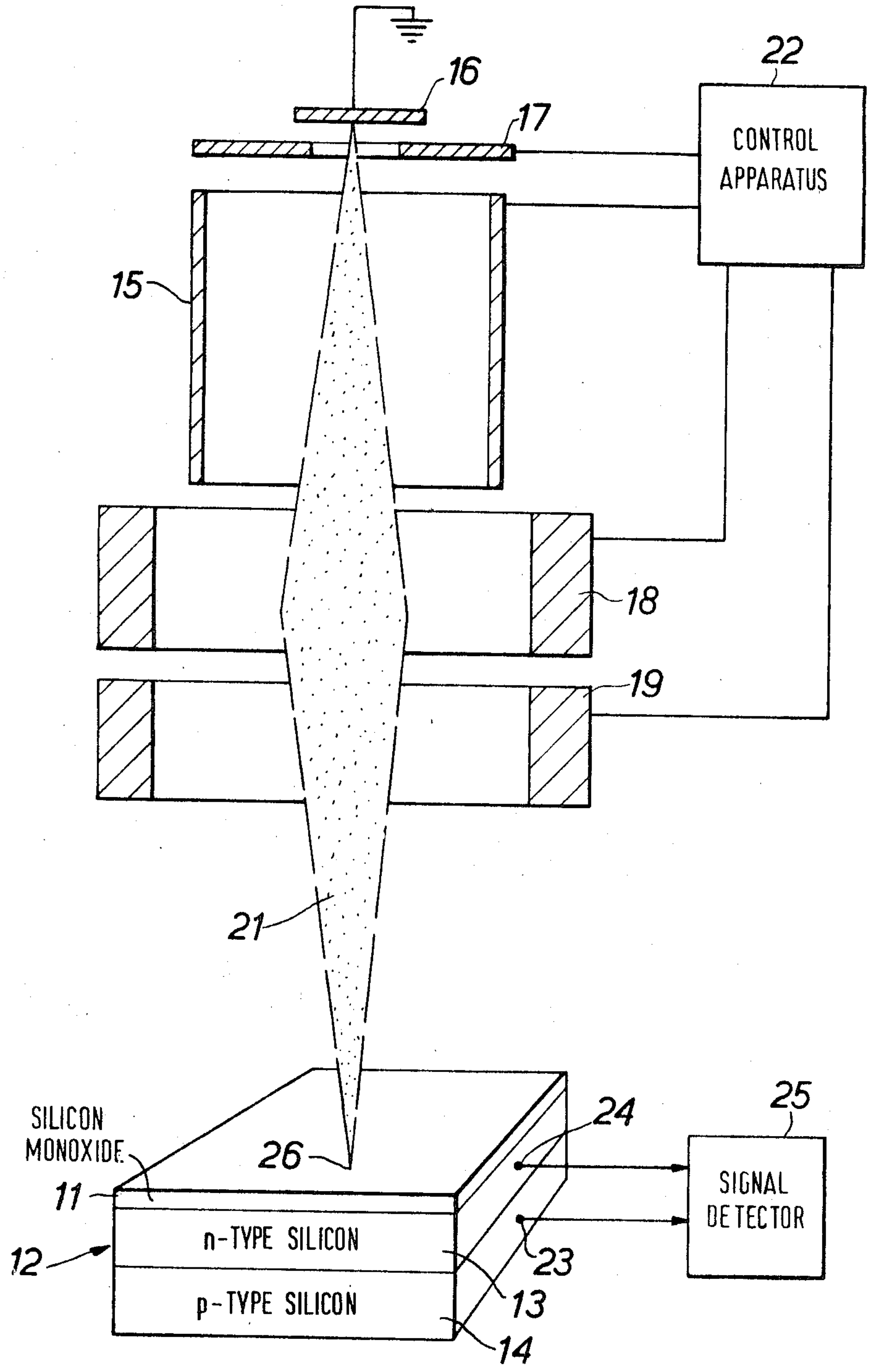

SOLID STATE COMPUTER MEMORY DEVICE

The present invention relates to improvements in memory devices.

In computer and like technology, memory devices are required on which information can be recorded, for example in a binary code, and can later be read from the memory device and in due course erased so that fresh information can be stored therein. For computer applications an extremely high rate of reading and writing is required and because of the large amount of information that has to be stored it is extremely desirable to make the memory device as compact as possible whilst still achieving rapid access.

The invention is based on a new theory which explains a number of diverse electrical effects in structures containing layers of chemically unsaturated oxides, such as silicon monoxide, bounded by metallic or semiconducting electrodes. The theory will account for the properties of thin-film metal—SiO—metal and metal—$Al_2O_3$—metal devices, and the electron emission from such structures is shown to be largely thermionic. The behavior of metal contacts on silicon surface-barrier diodes is explained. An extension of the theory accounts for the good thermionic emission efficiency of the activated oxide-coated cathode and the mode of conduction through it. The electrical noise in all the above devices is shown to possess a component with a common origin.

In order to explain the conduction mechanism, it is proposed that structural changes are brought about in an oxide film which is deficient in oxygen under the influence of an electric field and in the presence of a suitable metal electrode. These changes, in the glassy oxides, are akin to those involved in the process of devitrification which is often observed to begin at surface nucleation centers. Gold is known to provide good nucleation. Assuming, therefore, that in a silicon monoxide glass some degree of ordered structure is statistically probable at isolated points on a gold—SiO interface thus almost certainly some of these structures will contain chains of alternate silicon and oxygen atoms in which the silicon shows only twofold coordination, i.e. is bound only to two oxygen neighbors.

It is believed therefore that, as in the case of other conjugated resonance structures with free electron π-orbitals, electronic conduction occurs along such a chain. Thus graphite conducts within planar sheets owing to the overlap of valence and conduction bands for interacting π-orbitals; in polysulphur nitride, $(SN)_x$, there is similar behavior in infinitely long chain molecules.

There will therefore be short conducting chains of atoms terminating at one end in nucleation sites on the gold electrode. An intense electric field will be established at the free end of these chains, exerting anisotropic electric stress in the medium in this vicinity. The frequency, F, of nucleation of molecules on to crystals in supercooled liquids has been shown to be given by:

$F=(nD/a_o^2)\ exp(-W/kT)$ where $n$ is the density of molecules, $a_o$ is the molecular diameter, $D$ is a rate constant with the dimensions of a diffusion coefficient and $W$ is the thermodynamic barrier to nucleation, which for spherical crystals is $W=16\pi\delta^3/\ 3(\Delta G_v)^2$ in which δ is the surface tension at the interface and $G_v$ the free energy change per unit volume on crystallization. A similar strong dependence of F upon δ is to be expected in the order transition for a glass. If δ is reduced anisotropically by the polarization of the dielectric, nucleation will proceed predominantly along the electric vector. In this way the chains may grow until they extend completely through the oxide and electronic conduction through the chain will begin. This conductivity is highly anistropic.

In oxides other than silicon monoxide the oxygen deficiency which allows conjugation must be explained. In spontaneously formed oxides on silicon surfaces the conditions of unsaturation are found near the oxide-silicon interface. In other cases oxygen is removed in a high vacuum, and in the oxide coated cathode this is assisted by heating. In barium oxide it may be that conducting chains are formed by barium atoms and oxygen vacancies or F-centers.

Considering now the effect of current flow through the chains once these are established, in some practical cases the mean power may reach 1w./cm.$^2$ in a thin layer device and if this power is dissipated in a limited number of monomolecular chains the local heating will be intense and thermal agitation will rupture the chains. After a thermal relaxation time the electric field will tend to rejoin broken chains which once more heat up. The statistics of this, together with the thermal time constants involved, determine the characteristic 'flicker' noise which is observed in all these oxide devices and which predominates at low frequencies. The electron emission, which may initially be field emission, is rapidly dominated by thermionic emission as the ends of the chains become localized hot spots. This accounts for the high efficiency of the oxide-coated cathode and for the electron emission from thin-film metal—SiO—metal and metal—$Al_2O_3$—metal devices. In all these cases it has been observed that electron emission (and light emission) occurs from small scintillating centers.

The secondary electron emission coefficient from oxide-coated cathodes and oxidized metals has been found to be very high, sometimes $\simeq 10^3$ and the emission may persist after the primary beam is switched off. This can be explained in terms of the negative surface charge leaking away through conducting chains.

It has been shown that gold—SiO—aluminum devices may exhibit negative resistance after 'forming.' This process consists in applying an electric field of $\sim 10^5$v./cm. to the oxide in a near vacuum, and results in a sudden fall in resistance: this is now explained as due to the creation of conducting chains. When a subsequently applied voltage exceeds 3v. the current in the device decreases: the power dissipation is here causing rupture of the chains and electron emission begins at this point.

In the case of silicon surface-barrier diodes the production of conducting chains in the unsaturated oxide at the surface of the silicon leads to an enchantment of the surface-state density at the semiconductor boundary. The contact becomes, therefore, much more like an ideal metal—semiconductor Schottky barrier. Gold assists in the nucleation of SiO chains whereas aluminum appears to inhibit it, perhaps by competing more strongly for the available oxygen or forming a layer impervious to it.

The concept of conducting filaments of molecular dimensions can explain a diverse set of observations on oxide films and has application to, for example, thin-film oxide structures, semiconductor detectors, and cathodes for thermionic and secondary electron emission. It further appears that the concept is also relevant to films of fluorides as well as to oxides.

Thus devices may be fabricated in a manner such as to influence the creation of nucleation centers at the ends of short conducting filaments of atoms through the unsaturated oxide or fluoride.

Where conduction is required to be maximized the unsaturated oxide or fluoride and the electrode material is chosen so as to provide the maximum number of nucleation sites and associated short conducting filaments capable of growing under the influence of an electric field.

Where it is desired to inhibit conduction, say in the form of electron emission, the electrode is formed of a material, such as pyrolytic carbon, in which there is no oxide present to support the short conducting filaments.

According to the present invention a memory device comprises a layer of a chemically unsaturated oxide or fluoride of the type which is known to exhibit changes in conduction under electron bombardment in a vacuum, such layer being mounted upon a conducting or semiconducting substrate, in combination with electron beam generator means adapted to generate an electron beam and to cause the beam to scan the surface of the said layer, control means for controlling the current density of the electron beam, and means for sensing the effective conductance of the said layer. It is noted that the phrase "chemically unsaturated oxide" explicitly excludes the use of a layer consisting wholly of silicon dioxide. Such a layer is, of course, chemically saturated and clearly would not exhibit a change in conduction, under electron bombardment in a vacuum, which would persist after the bombardment ceases.

Preferably information is "written" in, "read out" from, or "erased" from the device by appropriately controlling and directing the electron beam at selected discrete areas of the said layer and the said control means has settings respectively for "moderate" electron beam current for writing, for "low" electron beam current for read out, and for "high" electron beam current for erasing.

For the purpose of this invention low, moderate and high electron beam currents are defines respectively as less than $10^{19}$a./sq. micron, between $10^{116}$ $^{9}$a./sq. micron and $10^{17}$a./sq. micron, and more than $10^{17}$a./sq. micron.

The invention further provides a memory device comprising an oxide layer, for example, silicon monoxide mounted upon a substrate in the form of a planar diffused or epitaxial semiconductor junction, and means for making electrical connection across the junction. The layer is located in a vacuum and a finely focused electron beam generating device having a scanning spot is arranged to scan over the surface. This electron beam has a controllable current density and the substrate is used as a target or anode for the electron beam. The substrate therefore has effectively three connections made to it.

A specific construction of memory device embodying the invention will now be described by way of example and with reference to the accompanying drawing which is a highly diagrammatic representation of the device.

In this example, a thin film 11 of silicon monoxide is deposited upon a substrate 12 having N-type and P-type silicon layers 13, 14 with a junction therebetween. Electrical connections to the P and N type layers are made at 23, 24 and these are coupled to signal detector 25.

This layered structure is mounted in an evacuated enclosure (not shown) provided with an electron gun, represented diagrammatically by anode 15, cathode 16 and control electrode 17. Focusing and further beam control is provided by electromagnets represented at 18, 19. The various electrical supplies for generating, focusing and scanning the electron beam 21 are provided by electronic control apparatus 22.

Depending upon the size of the spot 26 of the electron beam 21 the area of the oxide layer can be divided into discrete dots which can be each considered as the location of a bit of binary information, the binary state being in dependence upon whether the oxide layer in the specific area of the dot is relatively conducting or relatively nonconducting.

Assuming that the whole area of the oxide layer is in the relatively nonconducting state, information can be written thereon by scanning the electron beam across the individual areas and where it is desired, by virtue of the state of the information to change the state of the conductance of the oxide layer the electron beam current density is raised to a "-moderate" value which may be of the order of $10^{18}$a./sq. micron. In accordance with the theory set out above, this will establish in each of these areas a conducting chain or filament which will have the effect of varying the conductance of that area by a factor of some hundred times.

Information is read from the memory device by scanning the electron beam across the surface at a much lower current density, for example, of the order of $5\times10^{110}$ amps per square micron. Those areas which do not contain a conducting chain or filament will be of relatively high resistance whilst those which do contain the conducting chain or filament will be of relatively low resistance. The voltage developed across the junction of the substrate 12 is significantly greater when the electron beam 21 impinges upon an area of relatively low resistance, thus providing a signal which is detected by the signal detector 25.

In order to erase the impressed signal on the oxide layer, the oxide layer is scanned with an electron beam of a much higher current density which effectively "burns out" the conducting filaments or chains. In this way the device reverts to its initial state.

In order to increase the sensitivity of the device and the effectiveness of the filament forming procedure it may be desirable to apply a very thin gold or platinum layer to the surface of the oxide layer since these metals are known, in common with certain other metals, to promote the nucleation of conducting filaments.

Moreover in order to reduce the dead time which elapses between erasing a signal and being able to write a new signal it may be desirable to operate with the oxide layer at an elevated temperature, for example, 200° C.

Using silicon dioxide as the oxide layer and a thickness of the order of 1 micron together with an electron beam device capable of being focused to 0.25 microns it is possible to obtain a writing density of $10^{7}$ bits per square cm. It will be appreciated that a memory device having a writing density of this order and requiring only three connections independently of the number of locations in the device has considerable potential in computer technology.

The invention is not restricted to the details of the foregoing example. For instance, one need not necessarily use a semiconductor substrate; a conducting, e.g. metal, substrate can be used. Moreover the conductance of individual areas can be sensed by measuring the reflected electron beam as by using an electron multiplier.

I claim:

1. A memory device comprising a layer of chemically unsaturated oxide or fluoride exhibiting a change in conduction under electron bombardment in a vacuum, which change persists after the bombardment ceases, the said layer being mounted upon a conducting substrate, in combination with electron beam generator means, scanning means for causing the electron beam to scan over the said layer, control means for controlling the current density of the electron beam, and means for sensing the effective conductance of the said layer.

2. A memory device as claimed in claim 1, wherein the said control means includes means for setting the electron beam current at a high level for erasing, at a low level for read out and at an intermediate moderate level for writing, the said moderate level electron beam inducing, in the regions where said moderate level beam impinges upon the said layer, the said change in conduction in the layer, the said means for sensing the effective conductance of the said layer detecting the effect upon the low level electron beam of the conductance of the layer in the region where the low level electron beam impinges upon the layer, and the said high level electron beam being operative to disrupt, in the regions where said high level beam impinges upon the layer, such changes in conductance as may previously have been induced by the moderate level electron beam.

3. A memory device comprising means comprising a layer of chemically unsaturated oxide or fluoride exhibiting a change in conduction under electron bombardment in a vacuum which persists after the bombardment ceases, and a semiconducting substrate for mounting said layer, in combination with electron beam generator means, scanning means for causing the electron beam to scan over the said layer, control means for controlling the current density of the electron beam, and means for sensing the effective conductance of the said layer.

4. A memory device as claimed in claim 3, wherein the said control means has means for setting the electron beam current at a high level for erasing, a low level for read out and an intermediate moderate level for writing, the said moderate level electron beam inducing, in the regions where said moderate level beam impinges upon the said layer, the said change in conduction in the layer, the said means for sensing the effective conductance of the said layer detecting the effect upon the low level electron beam of the conductance of the layer in the region where the low level electron beam impinges upon the layer, and the said high level electron beam being operative to disrupt, in the regions where said high level beam impinges upon the layer, such changes in conductance as may previously have been induced by the moderate level electron beam.

5. A memory device as claimed in claim 3, wherein the said layer comprises an unsaturated oxide layer mounted upon a substrate in the form of a planar diffused or epitaxial semiconductor junction, said device further comprising means for making electrical connection across the junction.

6. A memory device as claimed in claim 5, wherein the unsaturated oxide layer comprises silicon monoxide and the substrate comprises layers of N and P type silicon with a junction therebetween.

7. A memory device comprising a chemically unsaturated oxide layer mounted upon a substrate, which substrate is in the form of a planar diffused or epitaxial semiconductor junction, with the junction substantially parallel with the interface between the said layer and the substrate, and means for making electrical connection across the junction.

8. A memory device as claimed in claim 7, wherein the unsaturated oxide layer comprises silicon monoxide and the substrate comprises layers of P and N type silicon with the junction therebetween.